US009103375B2

(12) United States Patent  
Seufert et al.

(10) Patent No.: US 9,103,375 B2  
(45) Date of Patent: Aug. 11, 2015

(54) CARTRIDGE BEARING ASSEMBLY

(71) Applicants: Stefanie Seufert, Rothhausen (DE); Eric Rasolonjatovo, Ann Arbor, MI (US); Thierry Poulle, Neuvy le Roi (FR)

(72) Inventors: Stefanie Seufert, Rothhausen (DE); Eric Rasolonjatovo, Ann Arbor, MI (US); Thierry Poulle, Neuvy le Roi (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 13/715,399

(22) Filed: Dec. 14, 2012

(65) Prior Publication Data

US 2014/0169719 A1 Jun. 19, 2014

(51) Int. Cl.
| | |
|---|---|
| F16C 19/38 | (2006.01) |
| F16C 33/60 | (2006.01) |
| F16C 35/04 | (2006.01) |
| F16C 33/66 | (2006.01) |
| F16C 35/067 | (2006.01) |

(52) U.S. Cl.
CPC ........... *F16C 33/6659* (2013.01); *F16C 19/383* (2013.01); *F16C 33/60* (2013.01); *F16C 35/067* (2013.01)

(58) Field of Classification Search
CPC ...... F16C 35/045; F16C 35/067; F16C 19/28; F16C 33/605
USPC ......... 384/428, 441, 462, 569, 475, 477, 490, 384/502, 504, 517, 537, 501, 571
See application file for complete search history.

(56) References Cited

U.S. PATENT DOCUMENTS

| | | | | |
|---|---|---|---|---|
| 1,806,748 | A | * | 5/1931 | Edwards ........................ 277/423 |
| 2,420,820 | A | | 5/1947 | Eastburg |
| 2,549,154 | A | * | 4/1951 | Amos ............................ 384/542 |
| 2,916,336 | A | * | 12/1959 | Andreini ........................ 384/569 |
| 3,007,748 | A | * | 11/1961 | Firth ............................. 384/495 |
| 3,095,248 | A | * | 6/1963 | Lindgren ....................... 384/536 |
| 3,108,839 | A | * | 10/1963 | Johnson ........................ 384/510 |
| 3,141,708 | A | | 7/1964 | Evangelista |
| 3,141,710 | A | * | 7/1964 | Lehman ........................ 384/477 |

(Continued)

FOREIGN PATENT DOCUMENTS

| | | |
|---|---|---|
| DE | 102011002913 A1 | 7/2012 |
| DE | 102011002913 Y | 7/2012 |

OTHER PUBLICATIONS

Blaine R. Copenhaver, PCT International Search Report, May 6, 2014.

*Primary Examiner* — Marcus Charles
(74) *Attorney, Agent, or Firm* — Mark Ussai; SKF USA Inc. Patent Dept.

(57) ABSTRACT

A cartridge bearing assembly for rotatably coupling a shaft with a housing includes a bearing having a central axis and opposing axial ends. The bearing includes first and second, axially spaced inner rings disposeable upon the shaft, at least one outer ring disposed circumferentially about the two inner rings, and first and second sets of rolling elements disposed between the inner and outer rings. A carrier includes a first tubular portion disposed generally about the bearing first axial end and a second tubular portion disposed generally about the bearing second axial end. The first and second tubular portions are coupled together to enclose the bearing, the carrier being at least partially disposeable within the housing bore so as to couple the bearing with the housing. Preferably, a coupler is provided to connect the first and second inner rings so as to establish preload within the bearing.

20 Claims, 10 Drawing Sheets

(56) References Cited

U.S. PATENT DOCUMENTS

| | | | |
|---|---|---|---|
| 3,187,591 A * | 6/1965 | Johnson | 384/558 |
| 3,298,760 A * | 1/1967 | Linner et al. | 384/464 |
| 3,314,735 A * | 4/1967 | Kocian | 384/475 |
| 3,506,317 A * | 4/1970 | Angeli | 384/542 |
| 4,006,946 A * | 2/1977 | Mann et al. | 384/558 |
| 4,124,257 A * | 11/1978 | Derner et al. | 384/498 |
| 4,726,696 A * | 2/1988 | Dickinson et al. | 384/477 |
| 4,798,482 A * | 1/1989 | Kruk | 384/571 |
| 4,824,264 A * | 4/1989 | Hoebel | 384/473 |
| 4,893,948 A | 1/1990 | Hoch | |
| 4,911,564 A * | 3/1990 | Baker | 384/145 |
| 4,993,850 A * | 2/1991 | Howse | 384/477 |
| 5,009,523 A * | 4/1991 | Folger et al. | 384/475 |
| 5,061,091 A * | 10/1991 | Shiratori | 384/539 |
| 5,328,275 A | 7/1994 | Winn | |
| 5,440,184 A * | 8/1995 | Samy et al. | 384/446 |
| 5,492,419 A * | 2/1996 | Miller et al. | 384/551 |
| 5,577,847 A * | 11/1996 | Nakamura et al. | 384/517 |
| 5,636,849 A * | 6/1997 | Jonsson et al. | 277/505 |
| 6,071,033 A * | 6/2000 | Neitzel et al. | 403/158 |
| 6,089,073 A | 7/2000 | Baur | |
| 6,123,462 A * | 9/2000 | Crowell | 384/517 |
| 6,132,099 A * | 10/2000 | Olszewski et al. | 384/498 |
| 6,315,457 B1 | 11/2001 | Hendrikus | |
| 6,328,312 B1 * | 12/2001 | Schmitz et al. | 384/486 |
| 6,464,401 B1 * | 10/2002 | Allard | 384/571 |
| 6,505,973 B2 * | 1/2003 | Buchheim et al. | 384/537 |
| 6,513,982 B2 * | 2/2003 | Boyd et al. | 384/475 |
| 6,851,863 B2 * | 2/2005 | Yokota et al. | 384/475 |
| 7,090,403 B2 * | 8/2006 | Orlowski et al. | 384/213 |
| 7,220,059 B2 | 5/2007 | Dieter | |
| 7,537,390 B2 | 5/2009 | De Boer | |
| 7,771,126 B2 * | 8/2010 | Faass et al. | 384/535 |
| 2004/0076356 A1 | 4/2004 | Hendrikus | |
| 2004/0169415 A1 | 9/2004 | Hendrikus | |
| 2008/0152275 A1 | 6/2008 | Wu | |
| 2009/0190874 A1 * | 7/2009 | Burner et al. | 384/558 |
| 2011/0026865 A1 | 2/2011 | Haas | |

* cited by examiner

CARTRIDGE BEARING ASSEMBLY

BACKGROUND OF THE INVENTION

The present invention relates to bearings, and more particularly to rolling element bearings for transmissions and gearboxes.

Bearing assemblies for rotatably coupling a gear shaft with the housing of a transmission or other gearbox typically include two separate bearings installed within a cylindrical or tubular carrier. As such carriers are typically formed of aluminum, the two bearings have to be provided with a relatively high preload to ensure that contact of all the bearing components is maintained at the elevated temperatures generally present during normal operation of the transmission or gearbox. That is, because the aluminum carrier expands at greater rate than the steel bearing rings, thereby reducing preloading in the bearings, a greater initial preload is necessary to offset the reduction at higher temperatures. This increased preloading results in energy losses and a reduction of the operating life of the bearings.

SUMMARY OF THE INVENTION

In one aspect, the present invention is a cartridge bearing assembly for rotatably coupling a shaft with a housing, the housing having a bore. The cartridge bearing assembly comprises a bearing having a central axis and opposing first and second axial ends, the bearing including first and second, axially spaced inner rings disposeable upon the shaft, at least one outer ring disposed circumferentially about the two inner rings, and first and second sets of rolling elements. The first set of rolling elements is disposed between the first inner ring and the at least one outer ring and the second set of rolling elements is disposed between the second inner ring and the at least one outer ring. A carrier includes a first tubular portion disposed about the bearing first axial end and a second tubular portion disposed about the bearing second axial end. The first and second tubular portions are coupled together to enclose the bearing. Further, the carrier is at least partially disposeable within the housing bore so as to couple the bearing with the housing.

In another aspect, the present invention is again a cartridge bearing carrier as generally described in the preceding paragraph, and in which each one of the first and second tubular portions is relatively thin-walled and includes a radially-outwardly extending coupler flange. The two coupler flanges are disposed against each other and coupled together so as to retain the bearing assembly disposed within the carrier. At least one of the two coupler flanges is attachable to the housing to connect the bearing with the housing when the carrier is at least partially disposed within the housing bore.

In a further aspect, the present invention is again a cartridge bearing as described two paragraphs above and wherein the carrier first tubular portion has a radially-inwardly extending circular flange with an inner circumferential surface defining an offset opening. The carrier offset opening has a central axis spaced radially from and extending generally parallel with the bearing axis. The at least one bearing outer ring has a generally annular offset shoulder extending generally axially from the bearing first end. The offset shoulder has an outer circumferential surface extending about a central axis spaced radially from and extending generally parallel with the bearing axis. Further, the bearing offset shoulder is disposed within the carrier offset opening such that the shoulder outer surface frictionally engages with the opening inner surface so as to prevent relative rotation between the bearing outer ring and the carrier.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a cartridge bearing assembly 10 for rotatably coupling a shaft 1 with a housing 2, the shaft 1 being rotatable about a central axis $A_C$ and the housing 2 having a bore 3. In one presently preferred application, the shaft 1 is a gear shaft of an automotive transmission or gearbox (none shown) and the housing 2 is at least a portion of the transmission/gearbox housing. However, the cartridge bearing assembly 10 may be used to rotatably couple any other appropriate shaft 1 and housing 2 (e.g., a compressor shaft and housing). The cartridge bearing assembly 10 basically comprises a bearing 12 mountable upon the shaft 1, the bearing 12 having a central axis $A_B$ and opposing first and second axial ends 12a, 12b, and a carrier 14 enclosing the bearing 12 and configured to couple the bearing 12 with the housing 2. The bearing 12 includes first and second, axially spaced inner rings 16, 18 disposeable upon the shaft 1, at least one outer ring 20 disposed circumferentially about the two inner rings 16, 18, and first and second sets 22, 24 of rolling elements 26, 28, respectively. The first set 22 of rolling elements 26 is disposed between the first inner ring 16 and the at least one outer ring 20 so as to form a first bearing subassembly 30A and the second set 24 of rolling elements 28 is disposed between the second inner ring 18 and the at least one outer ring 20 so as to form a second bearing subassembly 30B.

Figure 1:
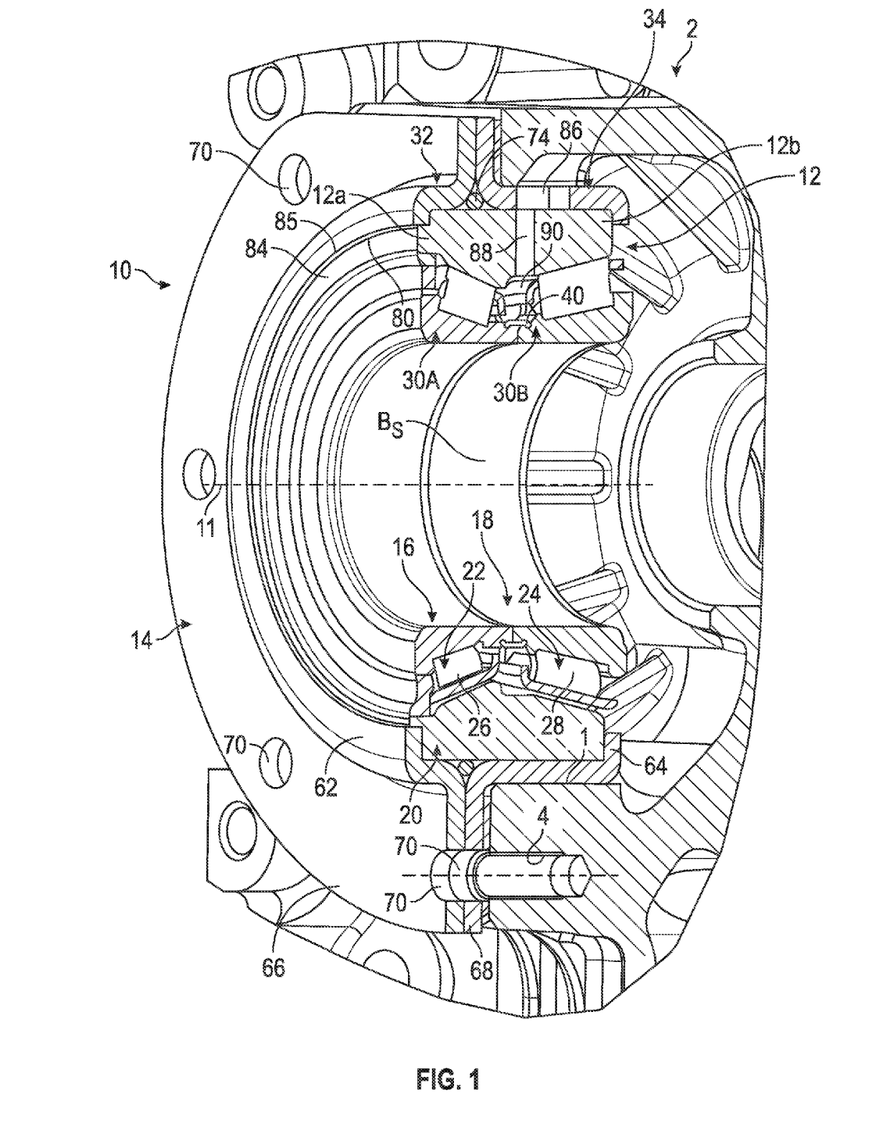
FIG. 1 is a partly broken-away, perspective view of a cartridge bearing assembly of the present invention, shown installed within a housing.
Figure 2:
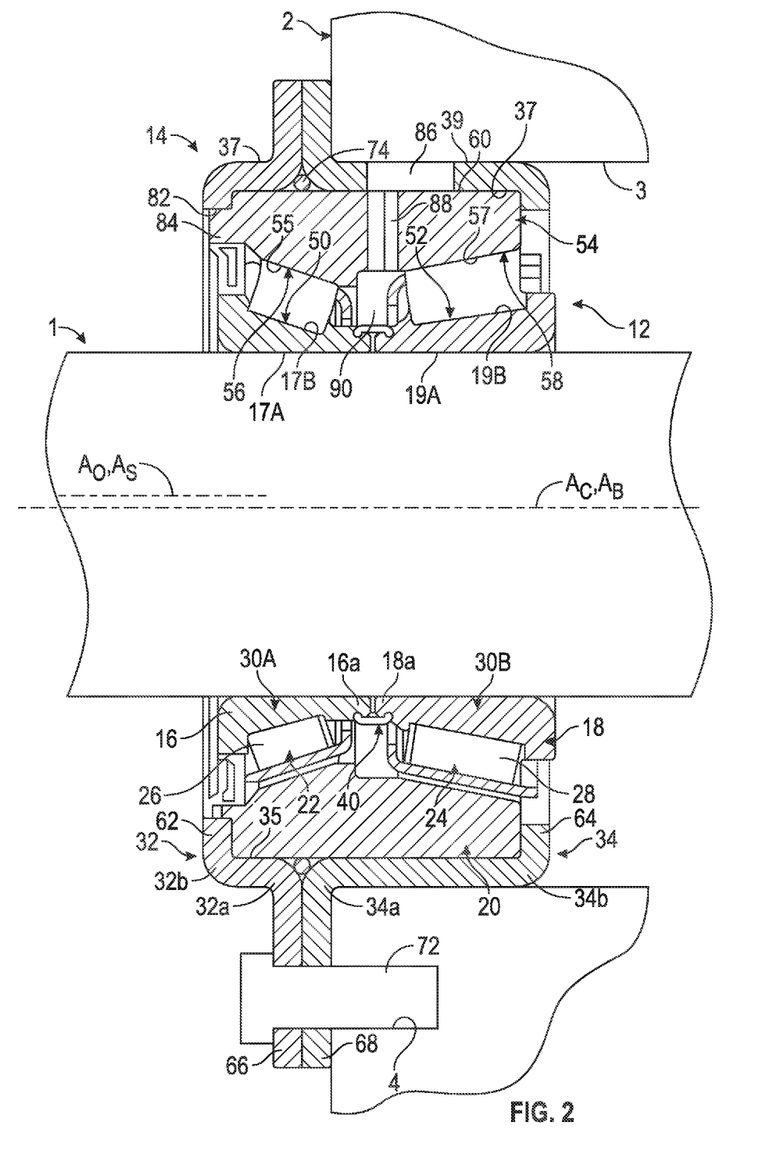
FIG. 2 is an axial cross-sectional view of the cartridge bearing assembly, shown installed upon a shaft and within the housing.
Figure 3:
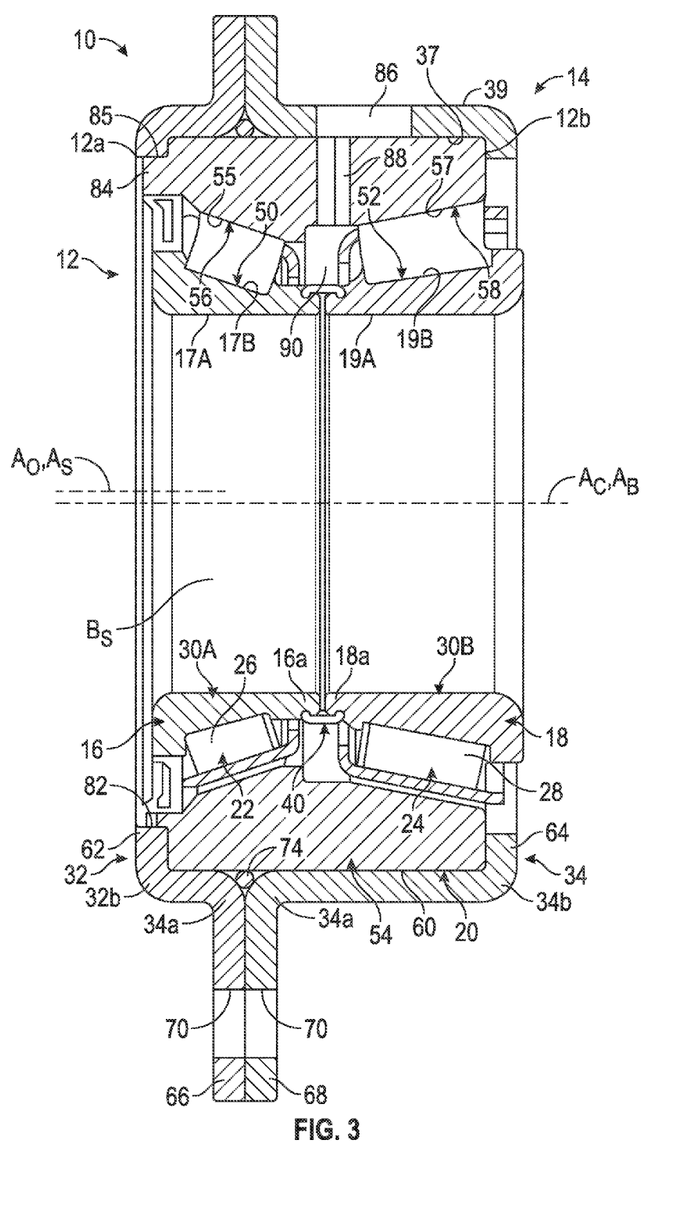
FIG. 3 is another axial cross-sectional view of the cartridge bearing assembly.
Figure 4:
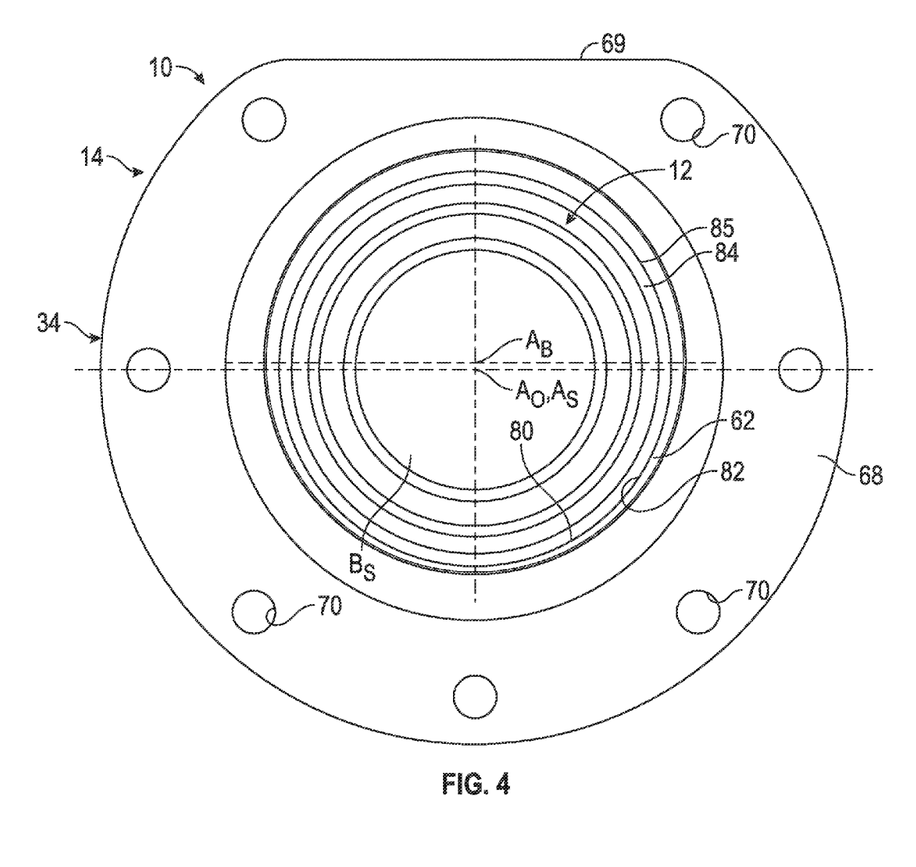
FIG. 4 is a front elevational view of the cartridge bearing assembly.
Figure 5:
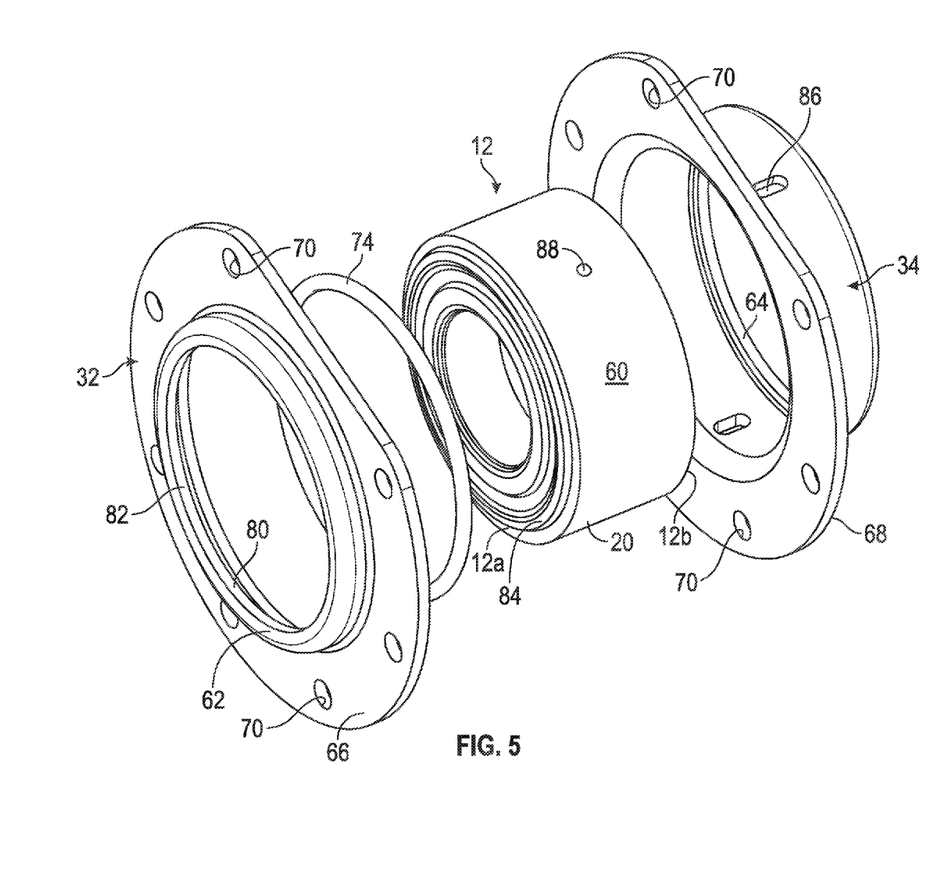
FIG. 5 is an exploded, perspective view of the cartridge bearing assembly.
Figure 6:
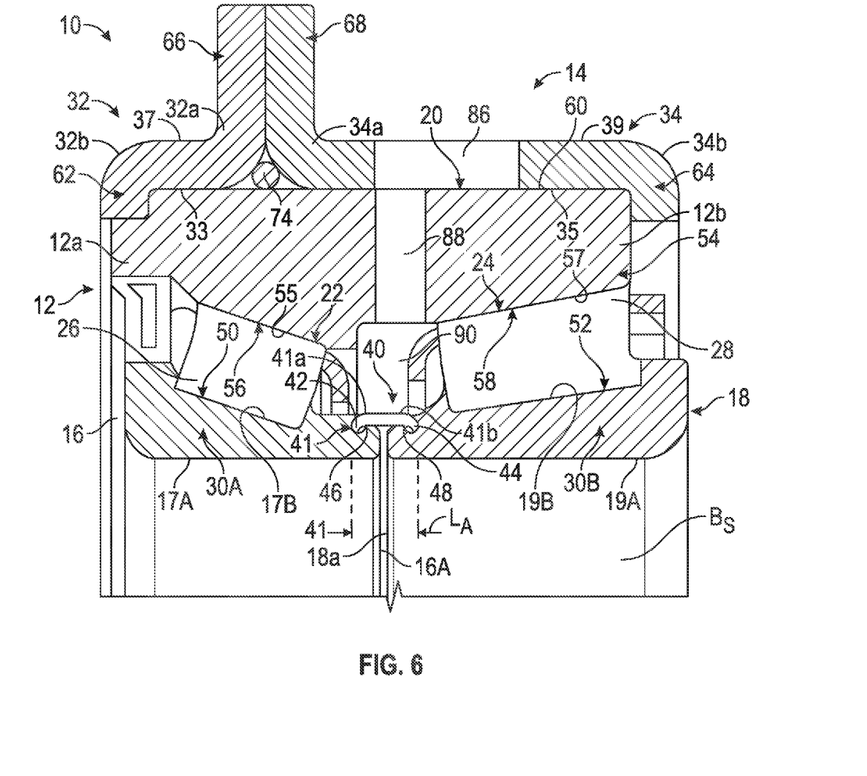
FIG. 6 is a broken-away, enlarged axial cross-sectional view of an upper portion of the cartridge bearing assembly.
Figure 7:
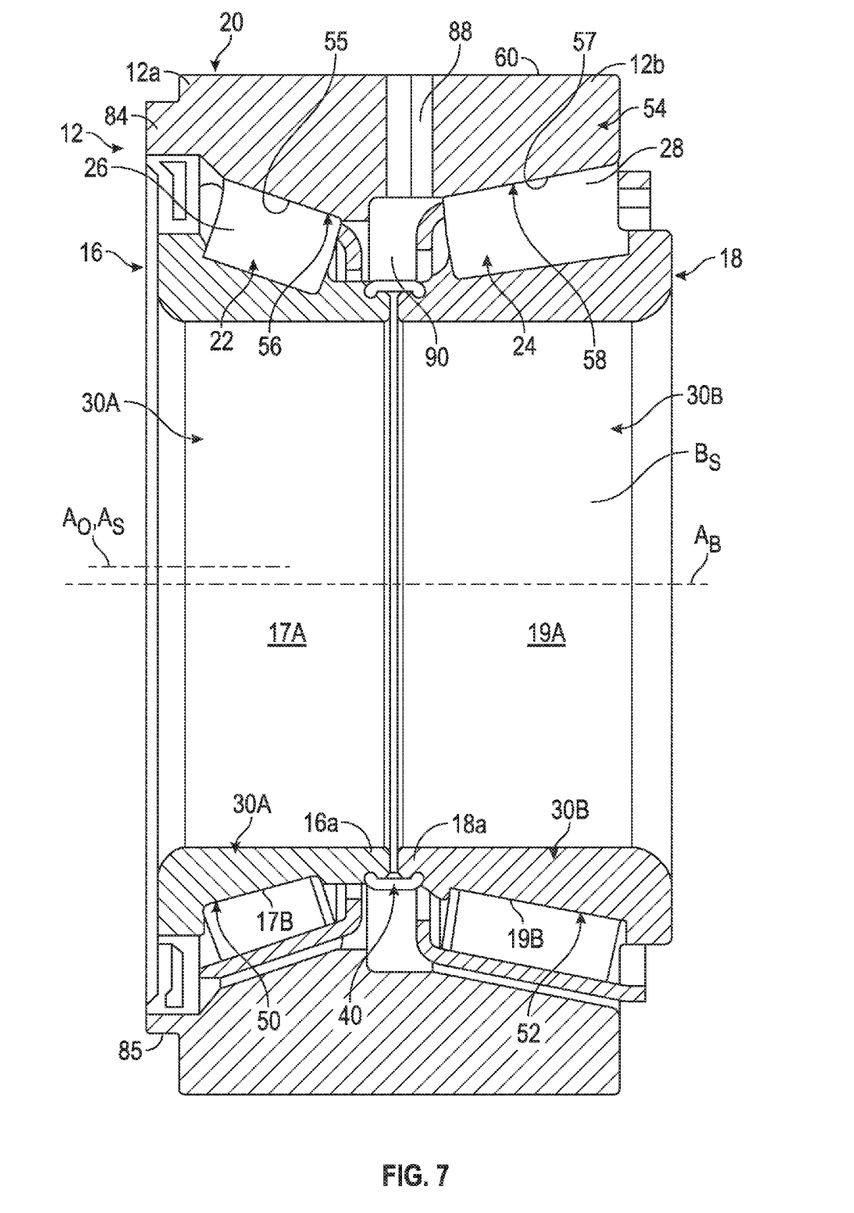
FIG. 7 is an axial cross-sectional view of a bearing of the cartridge bearing assembly.
Figure 8:
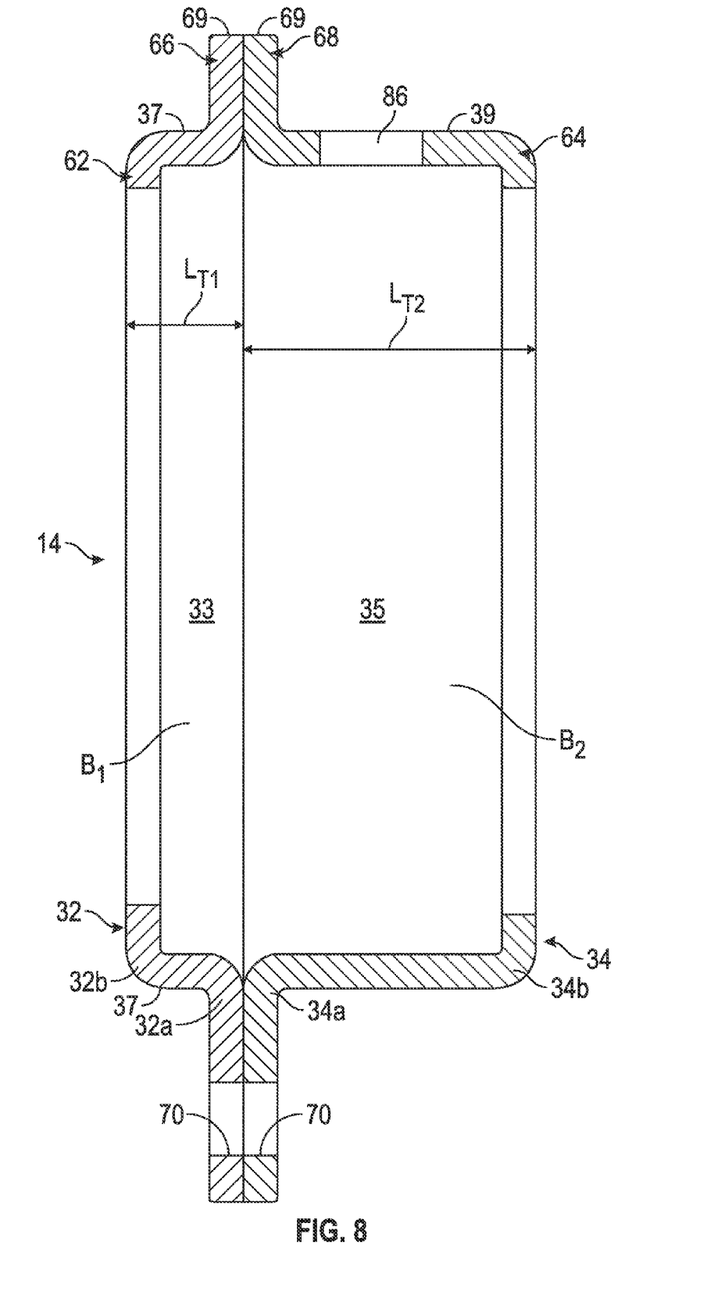
FIG. 8 is an axial cross-sectional view of a carrier of the cartridge bearing assembly.
Figure 9:
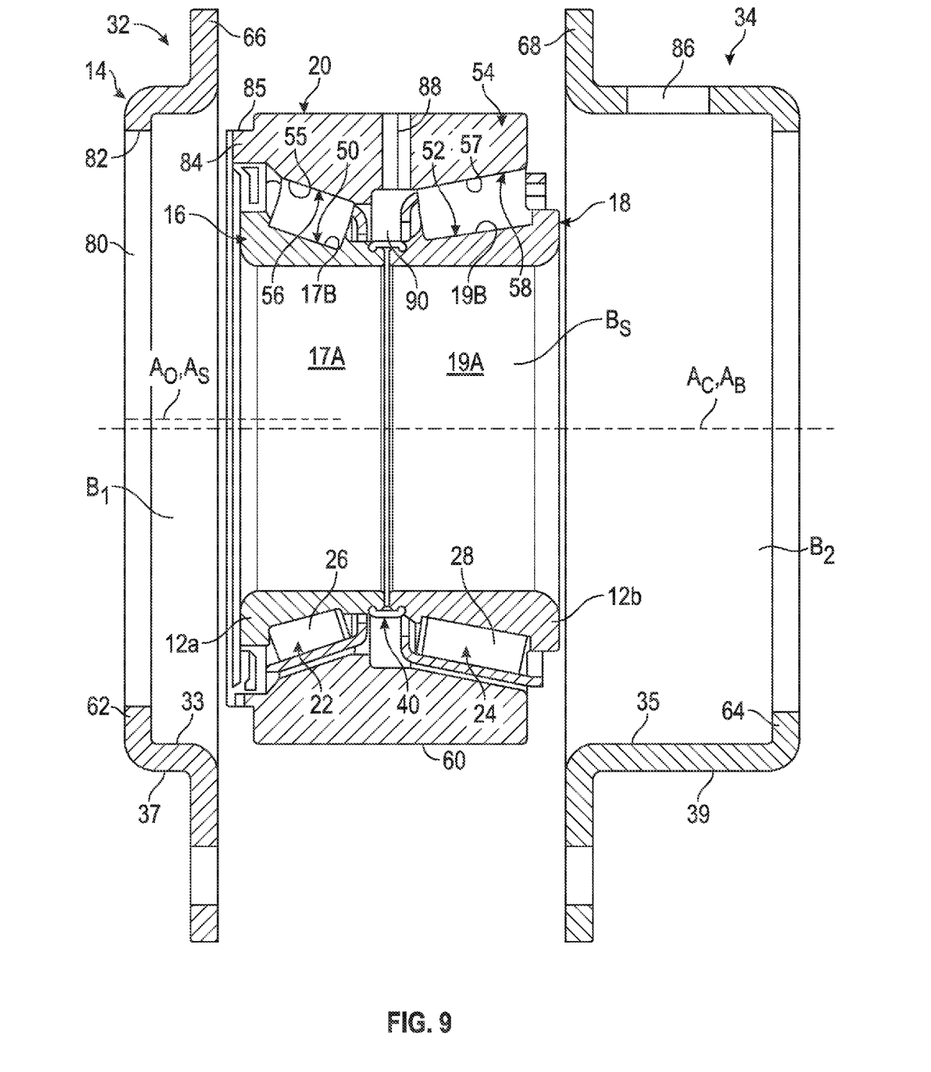
FIG. 9 is an axial cross-sectional view of the bearing and carrier, shown during installation of the bearing within the carrier.

Further, the carrier 14 includes a first tubular portion 32 disposed about the bearing first axial end 12a and a second tubular portion 34 disposed about the bearing second axial end 12b. The first and second tubular portions 32, 34 are coupled together to enclose the bearing 12, as described in detail below, and the carrier 14 is at least partially disposeable within the housing bore 3 so as to couple the bearing 12 with the housing 2. Preferably, each one of the carrier first and second tubular portions 32, 34 is relatively thin-walled, formed of steel or alloy steel, and fabricated in a conventional metal stamping process. Furthermore, the cartridge bearing assembly 10 preferably further comprises an annular connector 40 having a first axial end 40a engaged with the first inner ring 16 and a second axial end 40b engaged with the second inner ring 18 so as to couple the two inner rings 16, 18, as best shown in FIG. 6. The connector 40 has an axial length $L_A$ (FIG. 6) selected to establish a desired preload within the first bearing subassembly 30A and a preload within the second bearing subassembly 30B, as described in further detail below.

Due to the fact that the carrier 14 is preferably formed of steel or alloy steel, thermal expansion of the carrier 14 is substantially lesser than an aluminum housing or carrier. Therefore, the amount of preload necessary to maintain contact between the rolling elements 26, 28 and the inner and outer rings 16, 18 and 20 is substantially reduced compared to previously known transmission bearings, which are typically required to have a substantial preload to compensate for thermal expansion. As such, power losses are reduced in the transmission or other device in which the bearing assembly 10 is incorporated. Having described the basic components above, these and other elements of the present cartridge bearing assembly 10 are described in greater detail below.

Figure 10:
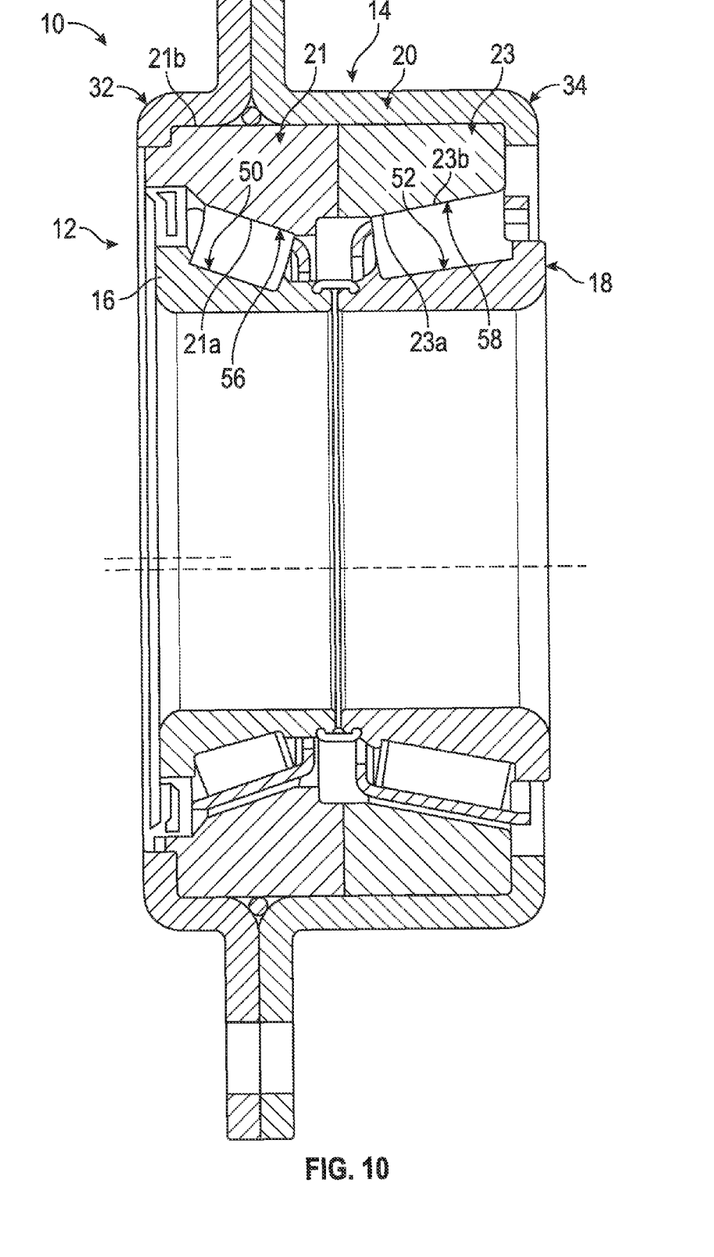
FIG. 10 is another axial cross-sectional view of the cartridge bearing assembly, shown with an alternative bearing construction with two separate outer rings.

Referring now to FIGS. 1-3, 6, 7, 9 and 10, the bearing 12 includes the two inner rings 16, 18 and either a single outer ring 20 (FIGS. 1-3, 6, 7 and 9) or two outer rings 21, 23 (FIG. 10). Specifically, each of the first and second inner rings 16, 18 includes inner and outer circumferential surfaces 17A, 17B and 19A, 19B, respectively, the inner surfaces 17A, 19A defining a bore $B_S$ for receiving a portion of the shaft 1. The outer circumferential surface 17B of the first ring 16 provides a first inner raceway 50 and the outer circumferential surface 19B of the second inner ring 18 provides a second inner raceway 52. In a presently preferred embodiment, the inner raceway surfaces 50, 52 are generally conical, are configured to support rolling elements 26, 28 that are formed as cylindrical rollers, and are each arranged to face generally toward the other inner raceway surface 52, 50 (and thus toward the geometric center of the bearing 12). However, the inner rings 16, 18 may be alternatively formed such that the inner raceways 50, 52 are arcuate grooves for supporting ball rolling elements (not depicted) or be arranged such that the raceways 50, 52 face generally away from each other and toward the proximal axial end 12a, 12b of the bearing 12.

Further, in one preferred embodiment shown in FIGS. 1-3, 6, 7 and 9, the at least one outer ring 20 is a single outer ring including a cylindrical body 54 disposed circumferentially about both of the two inner rings 16, 18, such that the bearing 12 is formed generally similar to a "hub bearing unit". The cylindrical body 54 has a first inner circumferential surface section 55 providing a first outer raceway 56, a second inner circumferential surface section 57 providing a second outer raceway 58, and an outer circumferential surface 60. The outer ring body 54 is disposed about the two inner rings 16, 18 such that the first outer raceway surface 56 is spaced generally radially outwardly from the first inner raceway surface 50 and the second outer raceway surface 58 is spaced generally radially outwardly from the second inner raceway surface 52. As with the inner rings 16, 18, the outer raceways 56, 58 are preferably formed generally conical for supporting cylindrical rolling elements 26, 28, respectively, but are instead preferably arranged to face generally away from each other and toward the proximal bearing end 12 or 12b. Alternatively, the outer raceways 56, 58 may be formed as arcuate grooves for receiving ball rolling elements (none shown) and/or may be arranged facing generally toward each other.

In any case, with such a bearing structure, the rolling elements 26 of the first set 22 are rollable simultaneously along the first inner and outer raceway surfaces 50, 56, respectively, and the rolling elements 28 of the second set 26 are rollable simultaneously along the second inner and outer raceway surfaces 52, 58, respectively. Although depicted as cylindrical rollers, the rolling elements 26, 28 may be spherical balls, tapered rollers, toroidal rollers or any other type of rolling element and/or each rolling element set 22, 24 may include a type of rolling element 26 or 28 different than the elements 28, 26 of the other set 24, 22 (e.g., elements 26 being cylindrical rollers and elements 28 being balls).

Referring specifically in FIG. 10, in another preferred embodiment, the at least one outer ring 20 includes first and second outer rings 21, 23, such that the bearing 12 is formed as an assembly of two separate, axially spaced bearings. Each one of the two outer rings 21, 23 has an inner circumferential surface 21a, 23a, respectively, and an outer circumferential surface 21b, 23b, respectively. The inner circumferential surface 21a of the first outer ring 21 provides the first outer raceway 56 and is spaced generally radially outwardly from the first inner raceway surface 50. Further, the inner circumferential surface 23a of the second outer ring 23 provides the second outer raceway 58 and is spaced generally radially outwardly from the second inner raceway surface 52. As discussed above, the outer raceways 56, 58 of two separate outer rings 21, 23 are formed having profiles to match the inner raceways 50, 52, depending on the particular type of rolling elements 26, 28.

Referring now to FIG. 6, the connector 40 preferably includes an annular body 41 having opposing axial ends 41a, 41b, a first annular shoulder 42 at the first end 40a, and a second annular shoulder 44 at the second end 40b. Each of the bearing inner rings 16, 18 preferably has an annular groove 46, 48 formed adjacent to an inner end 16a, 18a of each ring 16, 18. With this structure, the connector shoulders 42, 44 are disposed within a separate one of the two ring grooves 46, 48, respectively, to thereby couple the rings 16, 18. Due to the selected axial length $L_A$, the rings 16, 18 are positioned axially with respect to the at least one outer ring 20 such that a desired preload is generated within each bearing subassembly 30A, 30B. Although preferably a single annular ring 41, the connector 40 may alternatively be formed as one or more separate arcuate segments (not shown) or in any other appropriate manner capable of establishing a desired preload in the bearing 12.

Referring now to FIGS. 1-6 and 8-10, each one of the carrier first and second tubular portions 32, 34 has an inner axial end 32a, 34a, respectively, an opposing outer axial end 32b, 34b, respectively, and an axial length $L_{T1}$, $L_{T2}$ (FIG. 8), respectively, extending between the ends 32a, 32b and 34a, 34b, respectively. Preferably, the carrier 14 is formed such that the axial length $L_{T2}$ of the second tubular portion 34 is substantially greater than the axial length $L_{T1}$ of the first tubular portion 32, as depicted in the drawing figures. The carrier 14 is preferably formed in this manner due to the intended installation of the cartridge bearing assembly 10; specifically, with the first, "outer" tubular portion 32 being disposed externally of the housing 2 and the second, "inner" tubular portion 34 being disposed within the housing bore 3 when the cartridge bearing assembly 10 is mounted to the housing 2. As such, the majority of the bearing 12 is located within the bore 3 when the cartridge bearing assembly 10 is installed in a presently preferred application (e.g., within a transmission or gearbox).

Further, each one of the carrier first and second tubular portions 32, 34 has an inner circumferential surface 33, 35, respectively, defining a central bore $B_1$, $B_2$, respectively (see FIG. 8), and opposing outer circumferential surfaces 37, 39, respectively. The bore $B_1$ of the carrier first portion 32 is sized to receive the bearing first axial end 12a such that the inner surface 33 extends about a first section of the single ring outer surface 60 or of the first ring outer surface 21b. Further, the bore $B_2$ of the carrier second tubular portion 34 is sized to receive the bearing first axial end 12a such that the inner surface 35 extends about a second, remaining section of the single ring outer surface 60 or about the second ring outer surface 23b and the remainder of the first ring outer surface 21b. Preferably, the carrier portion inner surfaces 33, 35 are sized to engage with the outer ring outer surface 60 or surfaces 21b, 23b with a friction fit, but may be engageable by a locational fit or even a sliding fit, for reasons described below.

Still referring to FIGS. 1-6 and 8-10, each carrier tubular portion 32, 34 has a radially-inwardly extending annular retainer flange 62, 64 at the outer end 32b, 34b and a radially-outwardly extending annular coupler flange 66, 68 at the inner end 32a, 34a. Each retainer flange 62, 64 is preferably generally circular, and the carrier 14 is positioned on or about the bearing 12 such that the first portion retainer flange 62 is disposed generally against the bearing first axial end 12a and the second portion retainer flange 64 is disposed generally against the bearing second axial end 12b. As such, the at least one outer ring 20 is retained between the two retainer flanges 62, 64, and is most preferably sandwiched between the two flanges 62, 64 so as to prevent axial displacement of the at least one outer ring 20 relative to the carrier 14.

Further, the two coupler flanges 66, 68 are generally disposed against each other and coupled together so as to connect the first and second tubular portions 32, 34, and thereby retain the bearing 12 disposed within the carrier 14. At least one of the two coupler flanges 66, 68 are attachable to the housing 2 so as to connect the cartridge bearing assembly 10 with the housing 2. Most preferably, each coupler flange 66, 68 is generally circular and has a flat edge 69 and a plurality of through holes 70 spaced circumferentially about the flange 66, 68. With this structure, the two flat edges 69 are generally aligned to align the through holes 70, and to also align other features of the two carrier tubular portions 32, 34 as described in further detail below. A threaded fastener 72 (one shown—FIG. 1) is inserted through each of the aligned pairs of holes 70 and is engaged with a separate threaded hole 4 in the housing 2 so as to releasably connect the carrier 14 with the housing 2. Preferably, the cartridge bearing assembly 10 further comprises an annular sealing member 74, which is preferably an O-ring, disposed about the at least one outer ring 20 and generally between the first and second coupler flanges 66, 68 so as to seal any space between the flanges 66, 68.

Referring particularly to FIGS. 2, 3, 5, and 7-10, the cartridge bearing assembly 10 is preferably formed with an alignment feature that both aligns the bearing 12 with respect to the housing 2 and prevents relative rotation between the bearing 12 and the carrier 14. Specifically, the retainer flange 62 of the carrier first portion 32 is preferably generally circular and formed with an inner circumferential edge surface 80 defining an offset opening 82, the offset opening 82 having a central axis $A_O$ spaced radially from and extending generally parallel with the bearing axis $A_B$. Further, the at least one bearing outer ring 20 has a generally circular, annular offset shoulder 84 extending generally axially from the bearing first end 12a. The offset shoulder 84 has an outer circumferential surface 85 extending about a central axis $A_S$ spaced radially from and extending generally parallel with the bearing axis $A_B$, and is preferably formed with a tapering radial thickness about the perimeter.

With these structural features, the bearing offset shoulder 84 is disposed within the carrier offset opening 80, with the two axes $A_O$, $A_S$ being generally collinear, when the carrier 14 is assembled onto the bearing 12, such that the shoulder outer surface 85 frictionally engages with the opening inner surface 80 so as to prevent relative rotation between the bearing outer ring 20 and the carrier 14. Due to the engagement of the offset shoulder 84 and offset opening 82 preventing rotation of the at least one bearing outer ring 20 within the carrier 14, there is no requirement of frictional engagement between the tubular portion inner surfaces 33, 35 and the outer ring outer surfaces 60 or 21b and 23b. As such, the assembly of the two carrier tubular portions 32, 34 about the bearing 12 requires substantially less force than would otherwise be required. Although preferably generally circular, the offset opening 82 and offset shoulder 84 may have any other appropriate shape, such as for example, generally ovular or generally elliptical.

Referring to FIGS. 1-3 and 6-10, the cartridge bearing assembly 10 is preferably further includes lubricant passages 86, 88 communicable with a lubricant passage (not shown) within the housing 2. Specifically, the carrier second, inner tubular portion 34 preferably has a lubricant port 86 extending between the inner and outer surfaces 35, 39, respectively, of the tubular portion 34. Also, the at least one bearing outer ring 20 has a generally radial lubricant passage 88 that is fluidly communicable with an interior chamber 90 defined between the inner and outer rings 16, 18, and 20. The bearing passage 88 is located with respect to the outer ring shoulder 84 such that the lubricant passage 88 is radially aligned with the carrier lubricant port 86 by engagement of the bearing offset shoulder 84 with the carrier offset opening 80. Further, the carrier lubricant port 88 is located on the carrier 14 with respect the coupler flanges 66, 68 such that the port 86 is aligned with the housing lubricant passage (not shown) upon installation of the cartridge bearing assembly 10 within the housing 2.

The present cartridge bearing assembly 10 has a number of advantages over previously known bearing assemblies, particularly those for supporting gear shafts within a transmission or other gear box. In comparison with typical transmission bearings supplied as two bearings separately installed on a shaft and within a housing, the cartridge bearing assembly 10 does not require a customer to establish preloading, has a lesser preload requirements due to the bearing 12 being contained within a steel or alloy steel carrier 14, and is relatively easily installed by sliding the shaft 1 into the bearing 12 and the carrier 14 into the housing bore 3 and then bolting the carrier 14 to the housing 2. Also, by preferably having a carrier 14 formed of a thin-walled steel or alloy steel and fabricated in a stamping process, the cartridge assembly is relatively lightweight and has a relatively lower manufacturing cost.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A cartridge bearing assembly for rotatably coupling a shaft with a housing, the housing having a bore, the cartridge bearing assembly comprising;
    a bearing having a central axis and opposing first and second axial ends, the bearing including first and second, axially spaced inner rings disposeable upon the shaft, at least one outer ring disposed circumferentially about the two inner rings, and first and second sets of rolling elements, the first set of rolling elements being disposed between the first inner ring and the at least one outer ring so as to form a first bearing subassembly and the second set of rolling elements being disposed between the second inner ring and the at least one outer ring so as to form a second bearing subassembly; and
    a carrier including a first tubular portion disposed generally about the bearing first axial end and a second tubular portion disposed generally about the bearing second axial end, the first and second tubular portions being coupled together to enclose the bearing, the first and second tubular portions each including radially-extending flanges, the carrier being at least partially disposeable within the housing bore when the flanges are coupled to a common axial side surface of the housing, wherein each one of the carrier first and second tubular portions is relatively thin-walled and formed of one of steel and alloy steel.

2. The cartridge bearing assembly as recited in claim 1 further comprising an annular connector having a first axial end engaged with the first inner ring and a second axial end engaged with the second inner ring so as to couple the first and second inner rings, the connector having an axial length selected to establish a preload within the first bearing subassembly and a preload within the second bearing subassembly.

3. The cartridge bearing assembly as recited in claim 1 wherein each one of the first and second tubular portions includes a radially-outwardly extending coupler flange, the two coupler flanges being disposed against each other and coupled together so as to retain the bearing disposed within the carrier, at least one of the two coupler flanges being attachable to the housing so as to connect the cartridge bearing assembly with the housing.

4. The cartridge bearing assembly as recited in claim 3 wherein each one of the first and second tubular portions has an axial length, the axial length of the second tubular portion being substantially greater than the axial length of the first tubular portion, the first tubular portion being disposeable externally of the housing and the second tubular portion being disposeable within the housing bore when the cartridge bearing assembly is connected with the housing.

5. The cartridge bearing assembly as recited in claim 3 further comprising an annular sealing member disposed about the at least one outer ring and generally between the first and second coupler flanges.

6. The cartridge bearing assembly as recited in claim 1 wherein:
    the carrier first tubular portion has a radially-inwardly extending circular flange with an inner circumferential surface defining an offset opening, the carrier offset opening having a central axis spaced radially from and extending generally parallel with the bearing axis; and
    the at least one bearing outer ring has a generally annular offset shoulder extending generally axially from the bearing first end, the offset shoulder having an outer circumferential surface extending about a central axis spaced radially from and extending generally parallel with the bearing axis, the bearing offset shoulder being disposed within the carrier offset opening such that the shoulder outer surface frictionally engages with the opening inner surface so as to prevent relative rotation between the bearing outer ring and the carrier.

7. The cartridge bearing assembly as recited in claim 6 wherein:
    the carrier second tubular portion has inner and outer circumferential surfaces and a lubricant port extending between the inner and outer surfaces; and
    the at least one outer ring has a generally radial lubricant passage located with respect to the outer ring shoulder such that the lubricant passage is radially aligned with the lubricant port by engagement of the bearing shoulder with the carrier opening.

8. The cartridge bearing assembly as recited in claim 1 wherein the first inner ring has an outer circumferential surface providing a first inner raceway, the second inner ring has an outer circumferential surface providing a second inner raceway surface, and the at least one bearing outer ring includes one of:
    a generally cylindrical body having a first inner circumferential surface section providing a first outer raceway and a second inner circumferential surface section providing a second outer raceway, the first outer raceway surface being spaced radially outwardly from the first inner raceway surface and the second raceway surface being spaced radially outwardly from the second inner raceway surface; and
    a first outer ring having an inner circumferential surface section providing a first outer raceway and a second outer ring spaced axially from the first outer ring and having an inner circumferential surface providing a second outer raceway, the first outer raceway surface being spaced radially outwardly from the first inner raceway surface and the second raceway surface being spaced radially outwardly from the second inner raceway surface.

9. The cartridge bearing assembly as recited in claim 1 wherein:
    the at least one bearing outer ring has an outer circumferential surface;
    the carrier first tubular portion has an inner circumferential surface defining a central bore, the first portion bore being sized to receive the bearing first axial end such that the first portion inner surface extends about a first section of the outer ring outer surface; and
    the carrier second tubular portion has an inner circumferential surface defining a central bore, the second portion bore being sized to receive the bearing second axial end such that second portion inner surface extends about a second, remaining section of the outer ring outer surface.

10. The cartridge bearing assembly as recited in claim 9 wherein each one of the carrier first and second tubular portions has opposing inner and outer axial ends, a radially-inwardly extending annular retainer flange at the outer end and a radially-outwardly extending coupler flange at the inner end, the first tubular portion retainer flange being disposed against the bearing first axial end and the second tubular portion retainer flange being disposed against the bearing second axial end such that the at least one outer ring retained between the two retainer flanges, the two coupler flanges being generally disposed against each other and coupled together so as to connect the first and second tubular portions.

11. The cartridge bearing assembly as recited in claim 1 wherein:
the at least one bearing outer ring has an outer circumferential surface;
the carrier first tubular portion has an inner circumferential surface defining a central bore, the first portion bore being sized to receive the bearing first axial end such that the first portion inner surface extends about a first section of the outer ring outer surface; and
the carrier second tubular portion has an inner circumferential surface defining a central bore, the second portion bore being sized to receive the bearing second axial end such that second portion inner surface extends about a second, remaining section of the outer ring outer surface.

12. The cartridge bearing assembly as recited in claim 11 wherein each one of the carrier first and second tubular portions has opposing inner and outer axial ends, a radially-inwardly extending annular retainer flange at the outer end, the coupler flange extending from the inner end, the first tubular portion retainer flange being disposed against the bearing first axial end and the second tubular portion retainer flange being disposed against the bearing second axial end such that the at least one outer ring retained between the two retainer flanges.

13. The cartridge bearing assembly as recited in claim 1 wherein each one of the carrier first and second tubular portions is formed of one of steel and alloy steel.

14. The cartridge bearing assembly as recited in claim 1, wherein the carrier first tubular portion has a radially-inwardly extending circular flange with an inner circumferential surface defining an offset opening, the carrier offset opening having a central axis spaced radially from and extending generally parallel with the bearing axis.

15. A cartridge bearing assembly for rotatably coupling a shaft with a housing, the housing having a bore, the cartridge bearing assembly comprising;
a bearing having a central axis and opposing first and second axial ends, the bearing including first and second, axially spaced inner rings disposeable upon the shaft, at least one outer ring disposed circumferentially about the two inner rings, and first and second sets of rolling elements, the first set of rolling elements being disposed between the first inner ring and the at least one outer ring so as to form a first bearing subassembly and the second set of rolling elements being disposed between the second inner ring and the at least one outer ring so as to form a second bearing subassembly; and
a carrier including a first, relatively thin-walled tubular portion disposed about the bearing first axial end and a second, relatively thin-walled tubular portion disposed about the bearing second axial end, each one of the first and second tubular portions including a radially-outwardly extending coupler flange, the two coupler flanges being disposed against each other and coupled together so as to retain the bearing disposed within the carrier, the carrier being at least partially disposeable within the housing bore and at least one of the two coupler flanges being attachable to the housing so as to connect the bearing with the housing.

16. The cartridge bearing assembly as recited in claim 15 further comprising an annular connector having a first axial end engaged with the first inner ring and a second axial end engaged with the second inner ring so as to couple the first and second inner rings, the connector having an axial length selected to establish a preload within the first bearing subassembly and a preload within the second bearing subassembly.

17. The cartridge bearing assembly as recited in claim 15 wherein each one of the first and second tubular portions has an axial length, the axial length of the second tubular portion being substantially greater than the axial length of the first tubular portion, the first tubular portion being disposeable externally of the housing and the second tubular portion being disposeable within the housing bore when the cartridge bearing assembly is connected with the housing.

18. The cartridge bearing assembly as recited in claim 15 wherein:
the carrier first tubular portion has a radially-inwardly extending circular flange with an inner circumferential surface defining an offset opening, the carrier offset opening having a central axis spaced radially from and extending generally parallel with the bearing axis; and
the at least one bearing outer ring has a generally annular offset shoulder extending generally axially from the bearing first end, the offset shoulder having an outer circumferential surface extending about a central axis spaced radially from and extending generally parallel with the bearing axis, the bearing offset shoulder being disposed within the carrier offset opening such that the shoulder outer surface frictionally engages with the opening inner surface so as to prevent relative rotation between the bearing outer ring and the carrier.

19. The cartridge bearing assembly as recited in claim 18 wherein:
the carrier second tubular portion has inner and outer circumferential surfaces and a lubricant port extending between the inner and outer surfaces; and
the at least one outer ring has a generally radial lubricant passage located with respect to the outer ring shoulder such that the lubricant passage is radially aligned with the lubricant port by engagement of the bearing shoulder with the carrier opening.

20. A cartridge bearing assembly for rotatably coupling a shaft with a housing, the housing having a bore, the cartridge bearing assembly comprising;
a bearing having a central axis and opposing first and second axial ends, the bearing including first and second, axially spaced inner rings disposeable upon the shaft, at least one outer ring disposed circumferentially about the two inner rings, and first and second sets of rolling elements, the first set of rolling elements being disposed between the first inner ring and the at least one outer ring and the second set of rolling elements being disposed between the second inner ring and the at least one outer ring; and
a carrier including a first tubular portion disposeable about the bearing first axial end and a second tubular portion disposeable about the bearing second axial end, the first and second tubular portions being coupled together to enclose the bearing, the carrier being at least partially disposeable within the housing bore so as to couple the bearing with the housing;

wherein the carrier first tubular portion has a radially-inwardly extending circular flange with an inner circumferential surface defining an offset opening, the carrier offset opening having a central axis spaced radially from and extending generally parallel with the bearing axis, and the at least one bearing outer ring has a generally annular offset shoulder extending generally axially from the bearing first end, the offset shoulder having an outer circumferential surface extending about a central axis spaced radially from and extending generally parallel with the bearing axis, the bearing offset shoulder being disposed within the carrier offset opening such that the shoulder outer surface frictionally engages with the opening inner surface so as to prevent relative rotation between the bearing outer ring and the carrier.

* * * * *